M. BLUM.
MACHINE FOR KNEADING AND MIXING DOUGH.
APPLICATION FILED NOV. 4, 1909.

991,824.

Patented May 9, 1911.

Witnesses
C. A. Jarvis
Estelle O. Hamburger

Inventor
Margarete Blum
by Maurice Bloch
her attorney.

UNITED STATES PATENT OFFICE.

MARGARETE BLUM, OF HALLE-ON-THE-SAALE, GERMANY.

MACHINE FOR KNEADING AND MIXING DOUGH.

991,824.  Specification of Letters Patent.  Patented May 9, 1911.

Application filed November 4, 1909. Serial No. 526,181.

*To all whom it may concern:*

Be it known that I, MARGARETE BLUM, a subject of the King of Prussia, residing at Halle-on-the-Saale, Germany, have invented certain new and useful Improvements in Machines for Kneading and Mixing Dough, of which the following is a clear, full, and exact description.

This invention relates to a machine for kneading and mixing dough.

To carry out the purpose of my invention I so arrange and operate the various elements of which it is composed to simulate the kneading and mixing of dough by hand.

I will now proceed to describe my invention, and finally claim the novel features thereof, reference being had to the accompanying drawing, wherein:—

Figure 1:
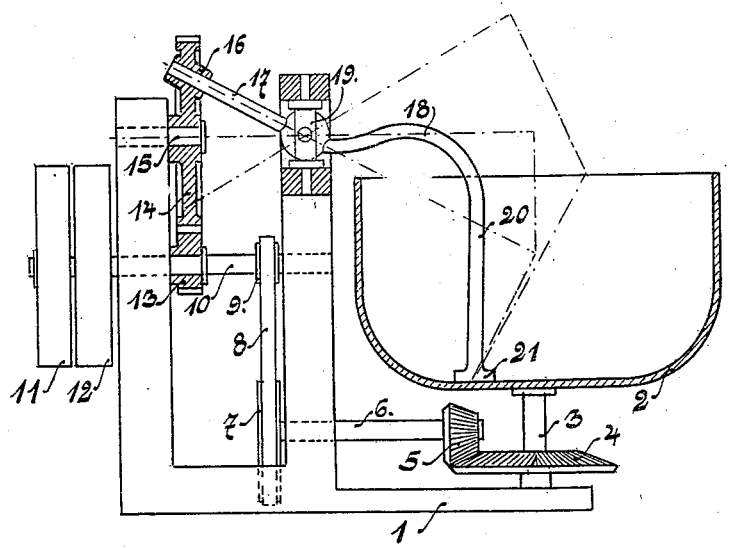
Figure 2:
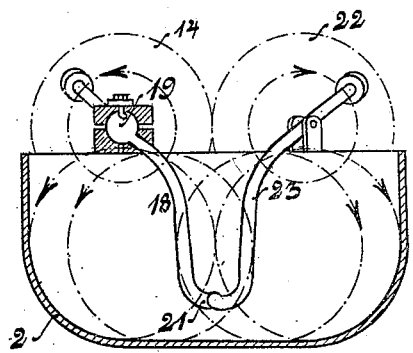

Figure 1 illustrates, in side elevation, my improved device, certain parts being shown in section; and Fig. 2 is a sectional front view thereof, one of the ball-bearing sockets being shown in section.

Referring now to the drawing, the numeral 1 indicates a support upon which is rotatably mounted a bowl 2, the said bowl being carried by a rotatable stub shaft 3, the said shaft carrying a gear 4 which is operated by a pinion 5 mounted upon a rotatable shaft 6. One end of the shaft 6 is provided with a pulley 7, which is connected by a belt 8 to a driving pulley 9 carried by a shaft 10. The shaft 10 is rotatably mounted in the support 1 and carries at the outer end thereof, the tight and loose pulleys 11 and 12 respectively. The shaft 10 also carries a pinion 13 which is adapted to mesh with the gear 14, rotatably mounted upon a stud 15, which in turn is carried by the support 1, as shown.

As can be seen in Fig. 1 the gear 14 is provided with an opening 16, the said opening being angularly disposed relative to the axis of the said gear 14. Within the opening 16 one end 17 of a paddle 18 is adapted to slidably fit, the paddle 18 being pivotally supported intermediate the ends thereof, as at 19, by the support 1. As can also be seen in Figs. 1 and 2 the paddle 18 is provided with an arm 20, which, at its lower end, is flattened as at 21. The purpose of the flattened portion 21 is to stir up the dough and turn it over and thoroughly knead and mix it.

When the gear 14 is caused to rotate, the arm 20 of the paddle 18 will have imparted thereto a circular movement. As the arm 20 rotates the flattened end 21 will describe an arc while passing through the dough, whereby the dough will be thoroughly stirred up or in other words, kneaded and mixed.

Referring to Fig. 2, it will be seen that the support 1 carries another gear 22 which is in mesh with the gear 14. The gear 22 operates a paddle 23 which operates in the same manner as the paddle 18 to knead and mix the dough in the bowl 2. As the gears 22 and 14 are in mesh the paddles 18 and 23 will be operated simultaneously in opposite directions, whereby the volume of dough in the bowl 2 is thoroughly mixed and kneaded.

Having now described my invention, what I claim and desire to secure by Letters Patent is:—

In a machine of the character described, a support, a driven main shaft carried by said support, a pinion carried by said main shaft, a gear pivotally mounted on said support and in mesh with said pinion, a universal pivotal support carried by the support first named, a paddle carried by said universal support and pivotally connected thereto, intermediate the ends thereof, said gear being provided with an opening adapted to receive one end of said paddle, whereby same may be rotated, a rotatable bowl carried by the support first named, a gear for rotating said bowl, a driven counter shaft, a pinion carried by said countershaft adapted to mesh with the gear for rotating said bowl, a pulley carried by said countershaft, a pulley carried by said main-shaft, and a belt connecting said pulleys, the free end of said paddle being bent downwardly to enter said bowl, the extremity of the free end of the said paddle being flattened.

In witness whereof I have hereunto set my hand in presence of two witnesses.

MARGARETE BLUM.

Witnesses:
  LEBER B. MYER,
  RUDOLPH FRICKE.